United States Patent
Winter et al.

(10) Patent No.: US 7,637,095 B2
(45) Date of Patent: Dec. 29, 2009

(54) THRUST VECTORABLE FAN VARIABLE AREA NOZZLE FOR A GAS TURBINE ENGINE FAN NACELLE

(75) Inventors: Michael Winter, New Haven, CT (US); Russell B. Hanson, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 521 days.

(21) Appl. No.: 11/582,219

(22) Filed: Oct. 17, 2006

(65) Prior Publication Data

US 2008/0001039 A1    Jan. 3, 2008

Related U.S. Application Data

(63) Continuation-in-part of application No. 11/478,009, filed on Jun. 29, 2006.

(51) Int. Cl.
*F02K 3/02* (2006.01)

(52) U.S. Cl. .................. 60/226.1; 60/771; 239/265.39

(58) Field of Classification Search ................ 60/226.1, 60/771; 239/265.33, 265.37, 265.39; 415/126, 415/129, 133; 416/205
See application file for complete search history.

(56) References Cited

U.S. PATENT DOCUMENTS

| | | | |
|---|---|---|---|
| 2,980,199 A * | 4/1961 | Storer | 181/215 |
| 4,044,973 A | 8/1977 | Moorehead | |
| 4,147,027 A | 4/1979 | Greathouse | |
| 4,205,813 A | 6/1980 | Evans et al. | |
| 4,301,980 A | 11/1981 | Bradfield et al. | |
| 4,410,150 A | 10/1983 | Lahti | |
| 4,466,587 A | 8/1984 | Dusa et al. | |
| 4,505,443 A | 3/1985 | Bradfield et al. | |
| 5,261,227 A * | 11/1993 | Giffin, III | 60/226.1 |
| 5,315,821 A | 5/1994 | Dunbar et al. | |
| 5,722,231 A | 3/1998 | Porte | |
| 5,743,488 A | 4/1998 | Rolston et al. | |
| 5,806,302 A | 9/1998 | Cariola et al. | |
| 5,853,148 A * | 12/1998 | Standish et al. | 244/110 B |
| 6,318,070 B1 * | 11/2001 | Rey et al. | 60/226.3 |
| 6,340,135 B1 | 1/2002 | Barton | |
| 6,378,781 B1 * | 4/2002 | Vicario | 239/265.39 |
| 6,820,410 B2 | 11/2004 | Lair | |
| 6,983,588 B2 | 1/2006 | Lair | |
| 7,093,793 B2 * | 8/2006 | Lair | 244/53 R |
| 7,216,831 B2 * | 5/2007 | Wood | 244/99.8 |
| 7,458,221 B1 * | 12/2008 | Arnold et al. | 60/771 |
| 2007/0234728 A1 * | 10/2007 | Peters | 60/771 |

(Continued)

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

A thrust vectorable fan variable area nozzle (FVAN) includes a synchronizing ring, a static ring, and a flap assembly mounted within a fan nacelle. An actuator assembly selectively rotates synchronizing ring segments relative the static ring to adjust segments of the flap assembly to vary the annular fan exit area and vector the thrust through asymmetrical movement of the thrust vectorable FVAN segments. In operation, adjustment of the entire periphery of the thrust vectorable FVAN in which all segments are moved simultaneously to maximize engine thrust and fuel economy during each flight regime. By separately adjusting the segments of the thrust vectorable FVAN, engine trust is selectively vectored to provide, for example only, trim balance or thrust controlled maneuvering.

9 Claims, 14 Drawing Sheets

U.S. PATENT DOCUMENTS

2008/0028763 A1* 2/2008 Schwarz et al. .............. 60/771
2008/0092548 A1* 4/2008 Morford et al. .............. 60/771
2008/0302907 A1* 12/2008 Schafer ...................... 244/54

* cited by examiner

THRUST VECTORABLE FAN VARIABLE AREA NOZZLE FOR A GAS TURBINE ENGINE FAN NACELLE

BACKGROUND OF THE INVENTION

The present application is a continuation-in-part patent application of U.S. patent application Ser. No. 11/478,009, filed Jun. 29, 2006.

The present invention relates to a gas turbine engine, and more particularly to a turbofan gas turbine engine having a thrust vectorable variable area nozzle structure within the fan nacelle thereof.

In an aircraft turbofan engine, air is pressurized in a compressor and mixed with fuel in a combustor for generating hot combustion gases which flow downstream through turbine stages that extract energy therefrom. A high pressure turbine powers the compressor, and a low pressure turbine powers a fan disposed upstream of the low pressure compressor.

Combustion gases are discharged from the core engine through a core exhaust nozzle and fan air is discharged through an annular fan exhaust nozzle defined at least partially by a nacelle surrounding the core engine. A majority of propulsion thrust is provided by the pressurized fan air discharged through the fan exhaust nozzle, the remaining thrust provided from the combustion gases discharged through the core exhaust nozzle.

It is known in the field of aircraft gas turbine engines that optimum performance of the engine may be achieved during different flight conditions of an aircraft by tailoring the exit area for specific flight regimes such as take off, cruise maneuver, and the like. In combat aircraft, the necessity of high performance requires the expense, weight, and increased complexity of a variable area nozzle structure through which all exhaust is directed. However, such considerations have precluded the incorporation of a variable area nozzle for the fan air of a turbofan gas turbine engine propulsion system typical of commercial and military transport type aircraft.

Accordingly, it is desirable to provide an effective, relatively inexpensive variable area nozzle for a gas turbine engine fan nacelle.

SUMMARY OF THE INVENTION

A thrust vectorable fan variable area nozzle (FVAN) according to the present invention includes a synchronizing ring assembly, a static ring, and a flap assembly mounted within a fan nacelle. Segments of the flap assembly are pivotally mounted to the static ring at a hinge and linked to independently rotatable segments of the synchronizing ring assembly through a respective linkage. An actuator assembly selectively rotates each of the synchronizing ring segments relative the static ring to separately adjust the flap assembly segments.

In operation, adjustment of the entire periphery of the thrust vectorable FVAN in which all segments are moved simultaneously is utilized to maximize engine thrust and fuel economy during each flight regime. By separately adjusting certain segments of the thrust vectorable FVAN in an asymmetric manner, engine thrust is selectively vectored to provide, for example only, trim balance or thrust controlled maneuvering.

The present invention therefore provides an effective, relatively inexpensive variable area nozzle for a gas turbine engine fan nacelle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
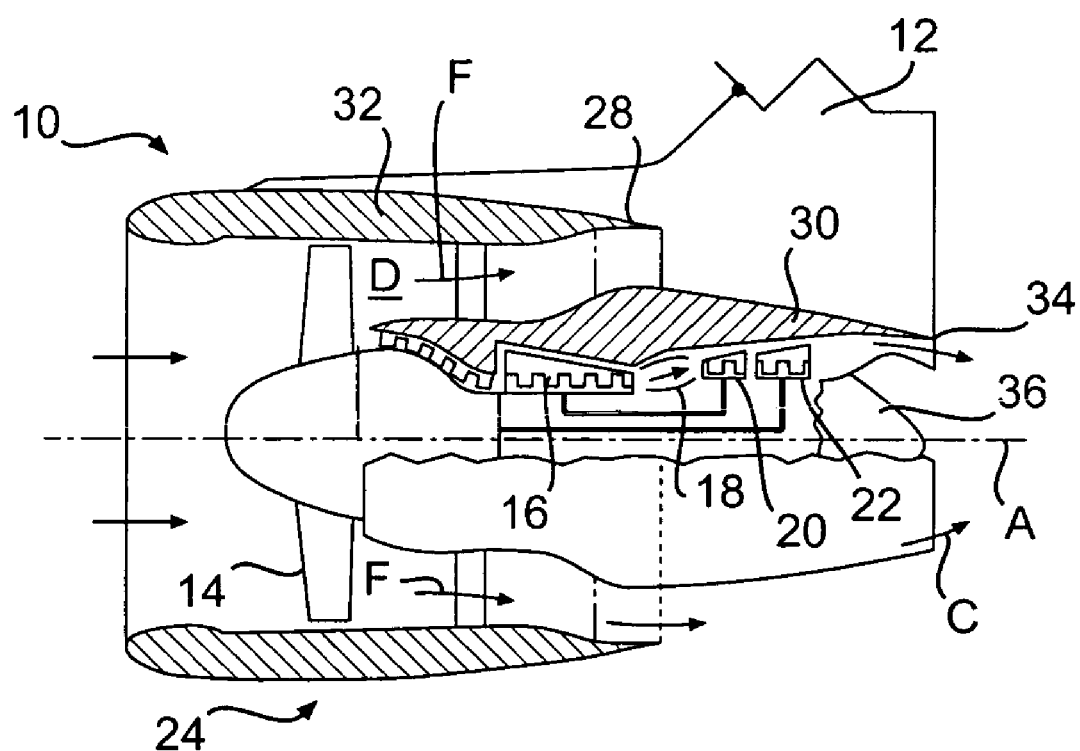
FIG. 1A is a general schematic view an exemplary turbo fan engine embodiment for use with the present invention.

FIG. 1A illustrates a general partial fragmentary view of a gas turbofan engine 10 suspended from an engine pylon 12 as typical of an aircraft designed for subsonic operation. The engine 10 is preferably a high-bypass turbofan aircraft engine. The engine 10 typically includes in serial flow communication a fan 14 with a low pressure compressor, a high pressure compressor 16, an annular combustor 18, high pressure turbine 20, and low pressure turbine 22. During operation, air is pressurized in the compressor and mixed with fuel in the combustor for generating hot combustion gases which flow through the high and low pressure turbines that extract energy therefrom. The high pressure turbine powers the compressor through a shaft therebetween, and the low pressure turbine powers the fan through another shaft therebetween.

The exemplary turbofan engine 10 is in the form of a high bypass ratio engine mounted within a nacelle assembly 24 in which most of the air pressurized by the fan bypasses the core engine itself for generating propulsion thrust. The fan air F is discharged from the engine 10 through a thrust vectorable fan variable area nozzle (FVAN) 28 (also illustrated in FIGS. 1B and 1C) defined radially between a core nacelle 30 and a fan nacelle 32. The thrust vectorable FVAN 28 preferably includes a multiple of separately movable segments 28A-28D (four shown). It should be understood that any number of segments may be utilized.

The core exhaust gases C are discharged from the core engine through a core exhaust nozzle 34 defined between the core nacelle 30 and a center plug 36 disposed coaxially therein around an engine longitudinal centerline axis A of the engine 10 and nacelle The thrust vectorable FVAN 28 of the fan nacelle 32 coaxially surrounds the core nacelle 30 to define a variable diameter nozzle downstream of an annular fan duct D for discharging axially the fan air F pressurized by the upstream fan 14.

Figure 2A:
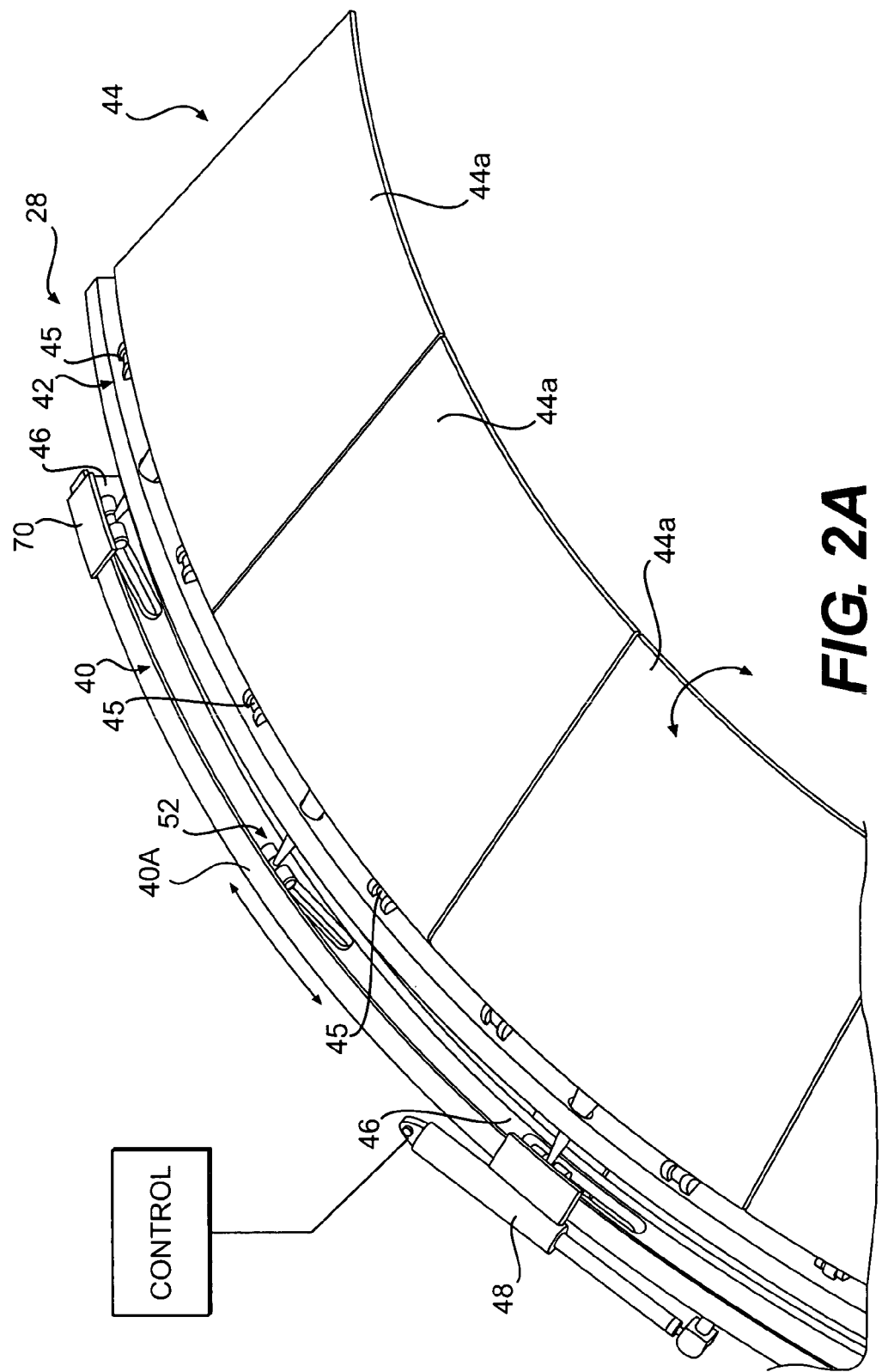
FIG. 2A is a perspective view of a section of the thrust vectorable FVAN.

Referring to FIG. 2A, a portion of the thrust vectorable FVAN 28 generally includes a synchronizing ring assembly 40, a static ring 42, and a flap assembly 44. The flap assembly 44 is pivotally mounted to the static ring 42 at a multitude of hinges 45 and linked to the synchronizing ring assembly 40 through a linkage 46. An actuator assembly 48 (only one shown) selectively rotates each segment of the FVAN 28A-28D by rotating the associated synchronizing ring segment 40A-40D (FIG. 2B) relative the static ring 42 to adjust the associated flap assembly 44 through the linkage 46 to vary the area defined by the thrust vectorable FVAN 28 through which the fan air F is discharged. It should be understood that various actuation systems which asymmetrically moves each segment of the FVAN 28A-28D may also be utilized with the present invention.

Figure 1B:
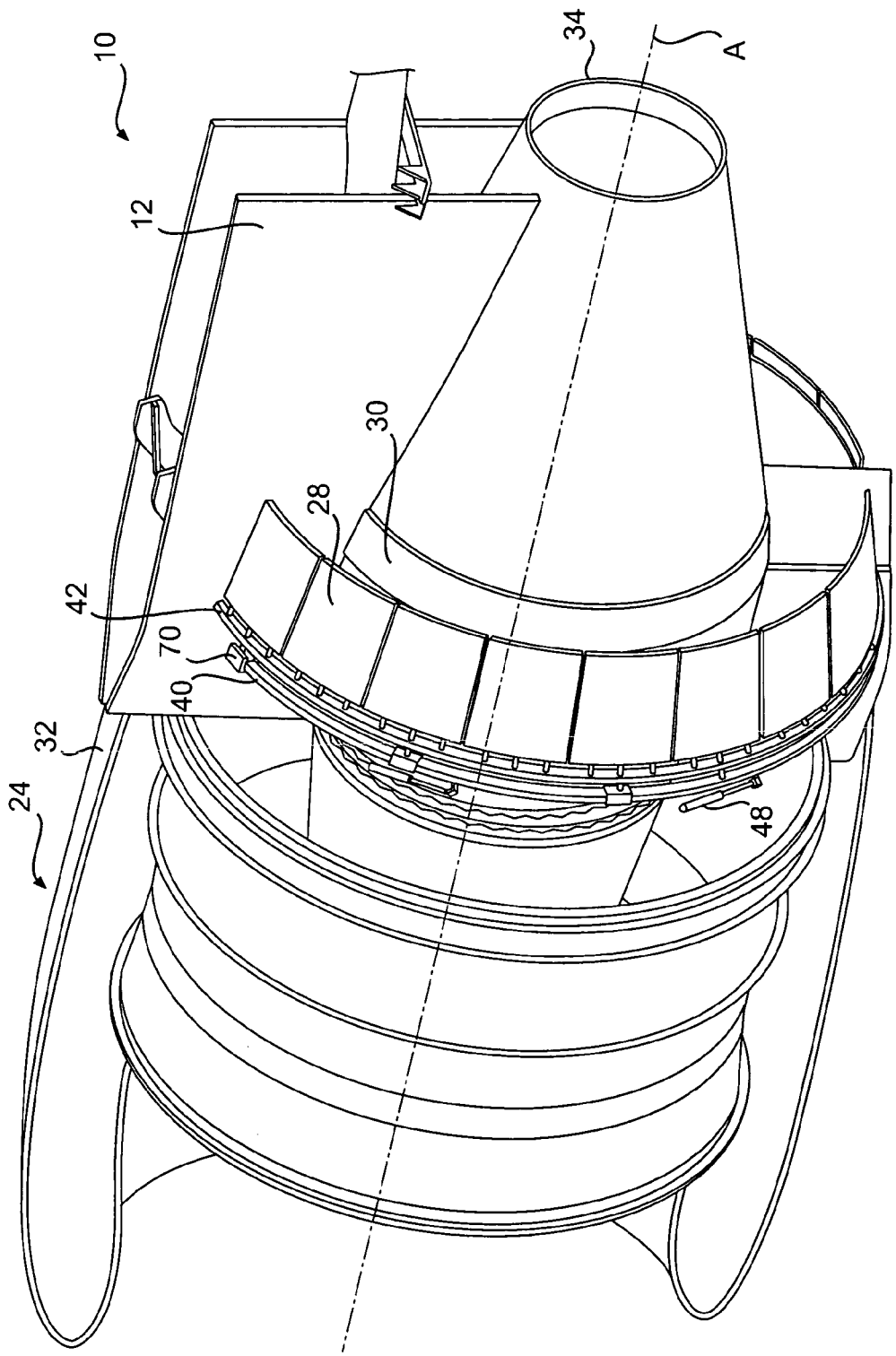
FIG. 1B is a perspective partial fragmentary view of the engine.
Figure 1C:
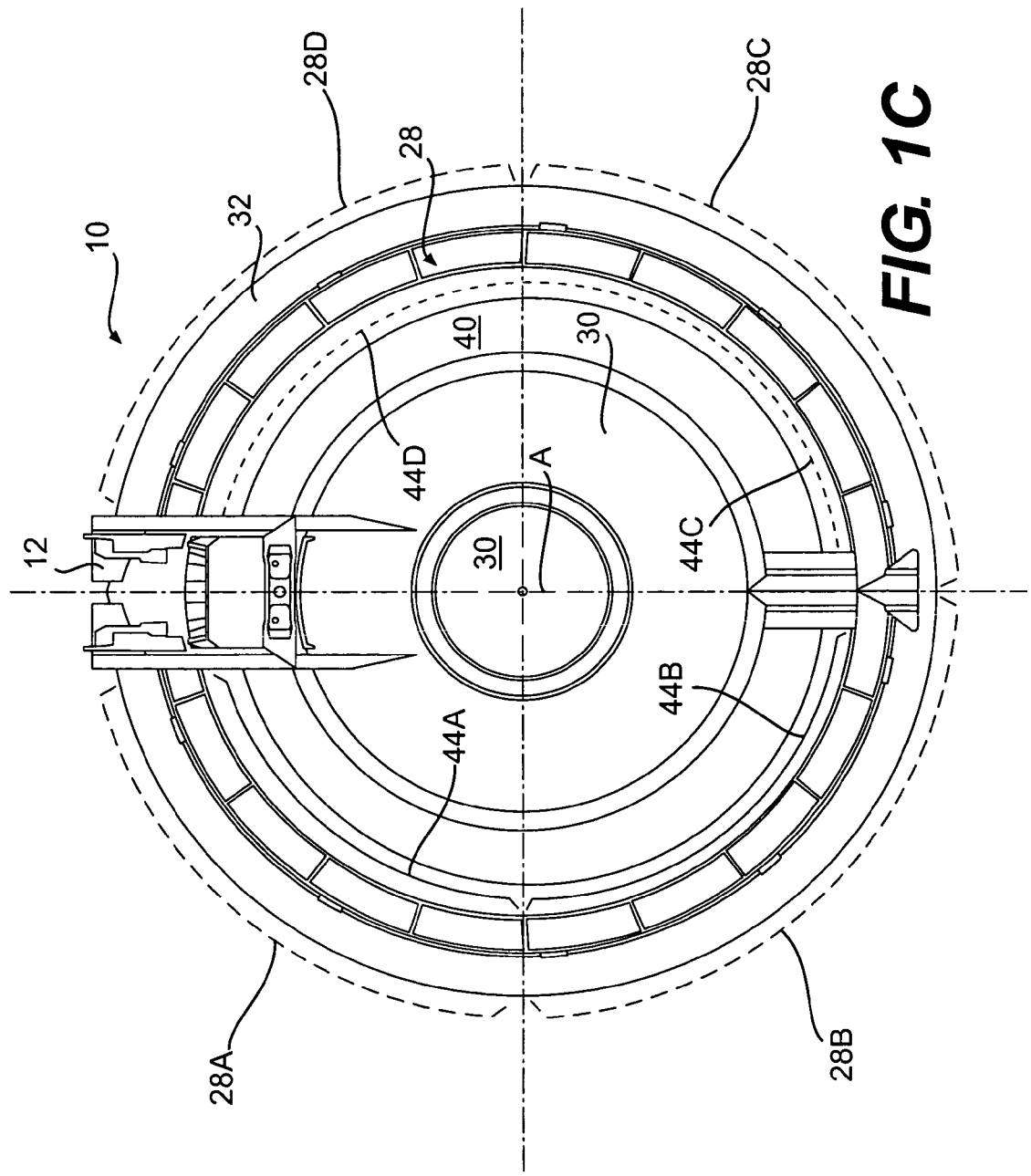
FIG. 1C is a rear view of the engine.
Figure 2B:
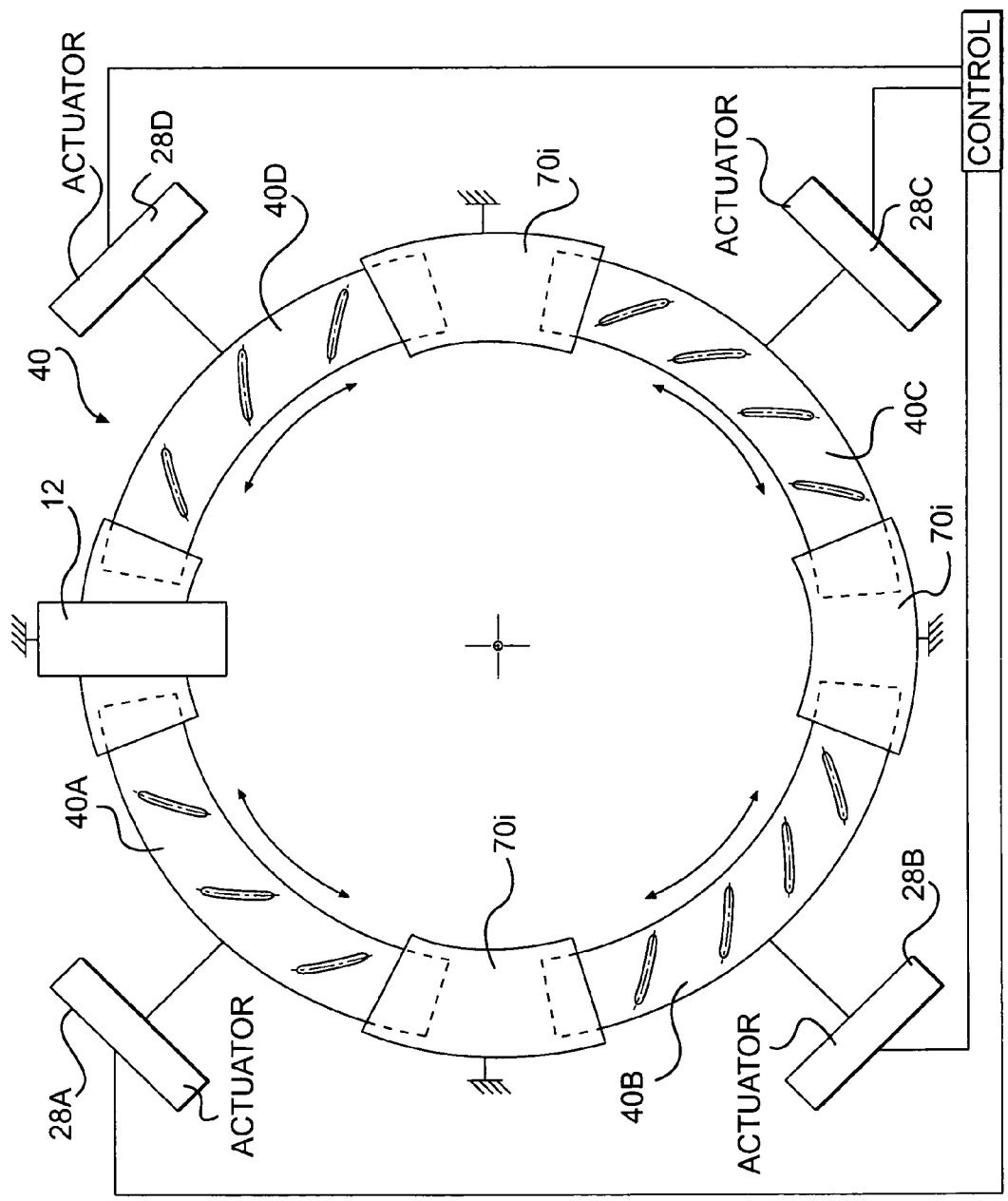
FIG. 2B is a schematic plan view of the synchronizing ring assembly and the segments thereof.

Referring to FIG. 2B, the synchronizing ring assembly 40 is mounted within a multitude of slider tracks 70 that are affixed within the fan nacelle 32 (FIG. 1B). The synchronizer ring segments 40A-40D are each independently rotatable and each adjust an associated adjustable flap assembly segment 44A-44D (FIG. 1C). That is, rotation of each synchronizer ring segment 40A-40D independently adjusts the associated adjustable flap assembly segment 44A-44D. Notably, the actuator assembly 48 includes linear actuators which rotate each segment 40A-40D of the synchronizing ring assembly 40 independently to thereby transferring relative significant force through a relatively uncomplicated, low-profile system.

Preferably, the synchronizer ring segments 40A-40D interface with adjacent segments within a synchronizing ring slider interface track 70i which permits for the independent rotation of each synchronizer ring segment 40A-40D by providing clearance therebetween. That is, each synchronizing ring slider interface track 70i are fixed members within which two adjacent synchronizer ring segments 40A-40D are slidably supported for independent movement.

The thrust vectorable FVAN 28 is preferably separated into four segments 28A, 28B, 28C, 28D defined by the synchronizer ring segments 40A-40D and the associated adjustable flap assembly segment 44A-44D. The four segments 28A-28D are each independently adjustable. That is, at the interface between each segment 28A-28D—defined by the synchronizing ring slider interface tracks 70i—there is no nested tongue and groove arrangement such that the flaps on each side of the adjacent segments are not nested when assembled (FIG. 3B). It should be understood that a flexible seal arrangement may be located between each segment 28A, 28B, 28C, 28D. It should be further understood that although four segments are illustrated, any number of segments as well as independent flap operation may alternatively or additionally be provided. One such alternative embodiment may provide only an upper and lower segment (28A and 28D are combined and 28B and 28C are combined).

Figure 2C:
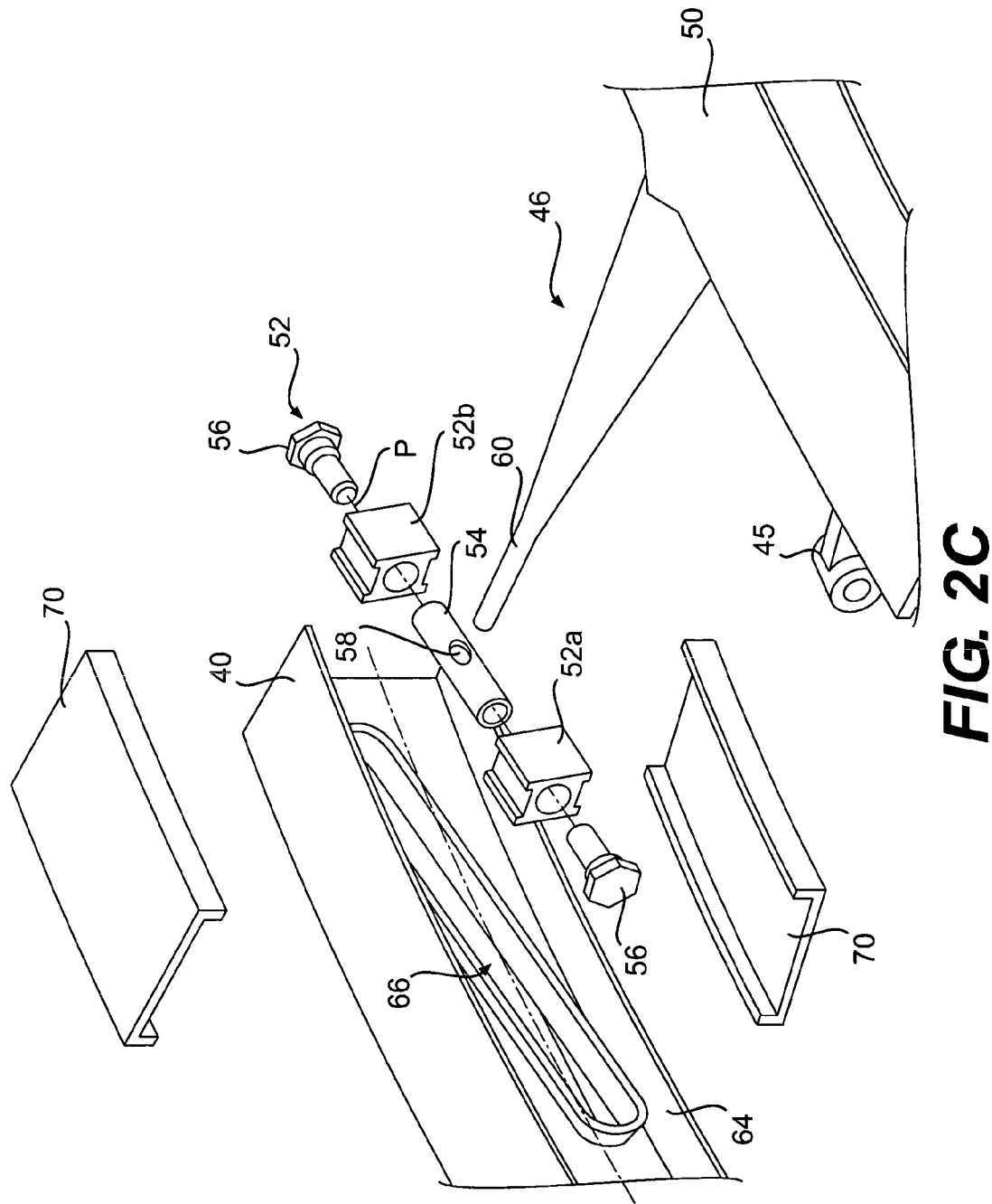
FIG. 2C is an exploded view of the linkage for one flap of the thrust vectorable FVAN.

Referring to FIG. 2C, the linkage 46 for each flap 44a of the flap assembly 44 generally includes a hinge beam 50, a slider block assembly 52 and a hinge pin 54 mounted to the slider block assembly 52 through a fastener 56. The slider block assembly 52 preferably includes a first slider block 52a and a second slider block 52b between which the hinge pin 54 is mounted through the fasteners 56 for rotation about the longitudinal axis P thereof. The hinge pin 54 includes an aperture 58 which receives a hinge beam rod 60.

Figure 3A:
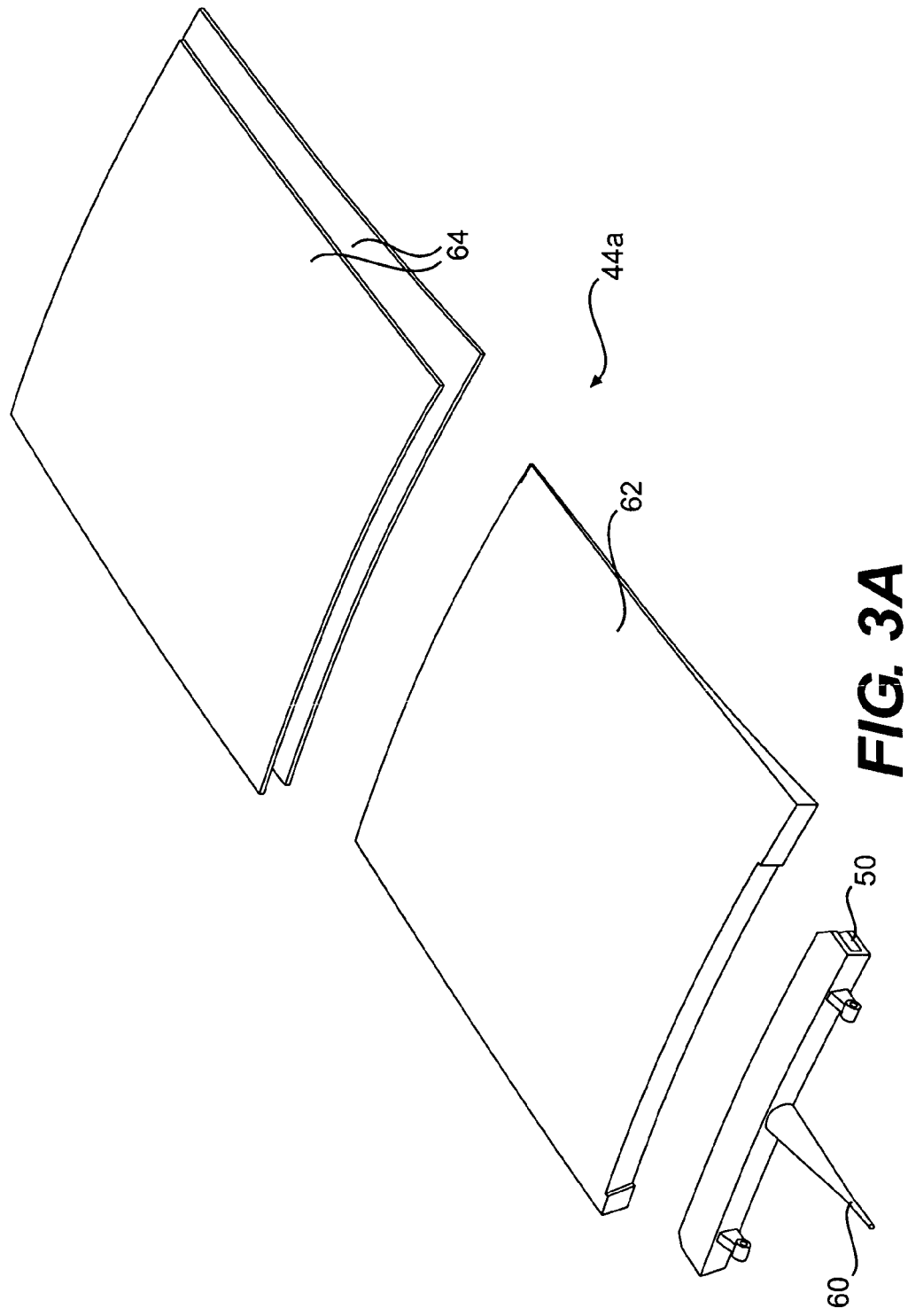
FIG. 3A is an exploded view of one flap of the thrust vectorable FVAN.
Figure 3B:
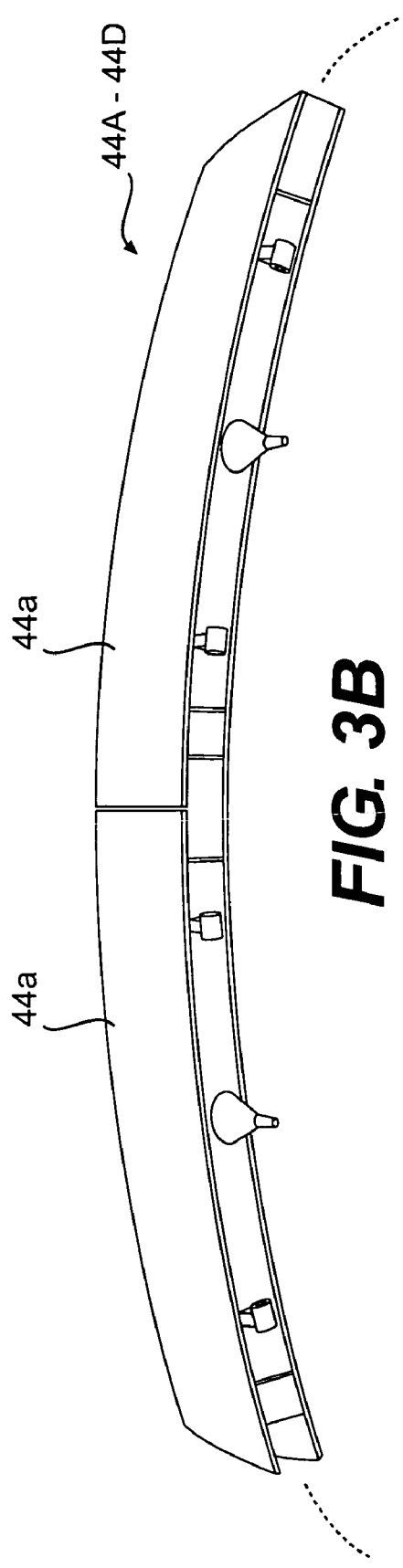
FIG. 3B is a rear view illustrating the sliding tongue and groove interface between two flaps of the flap assembly.

Each flap 44a preferably includes a machined aluminum honeycomb core 62 and carbon fiber skins 64 mounted to the hinge beam 50 (FIG. 3A). Each flap 44a in each segment 28A-28D includes a nested tongue and groove arrangement such that the flaps 44a in each segment 28A-28D are nested when assembled (FIG. 3B). That is, each flap 44a engages the adjacent flaps 44a to provide a circumferential seal which defines the exit area.

Figure 2D:
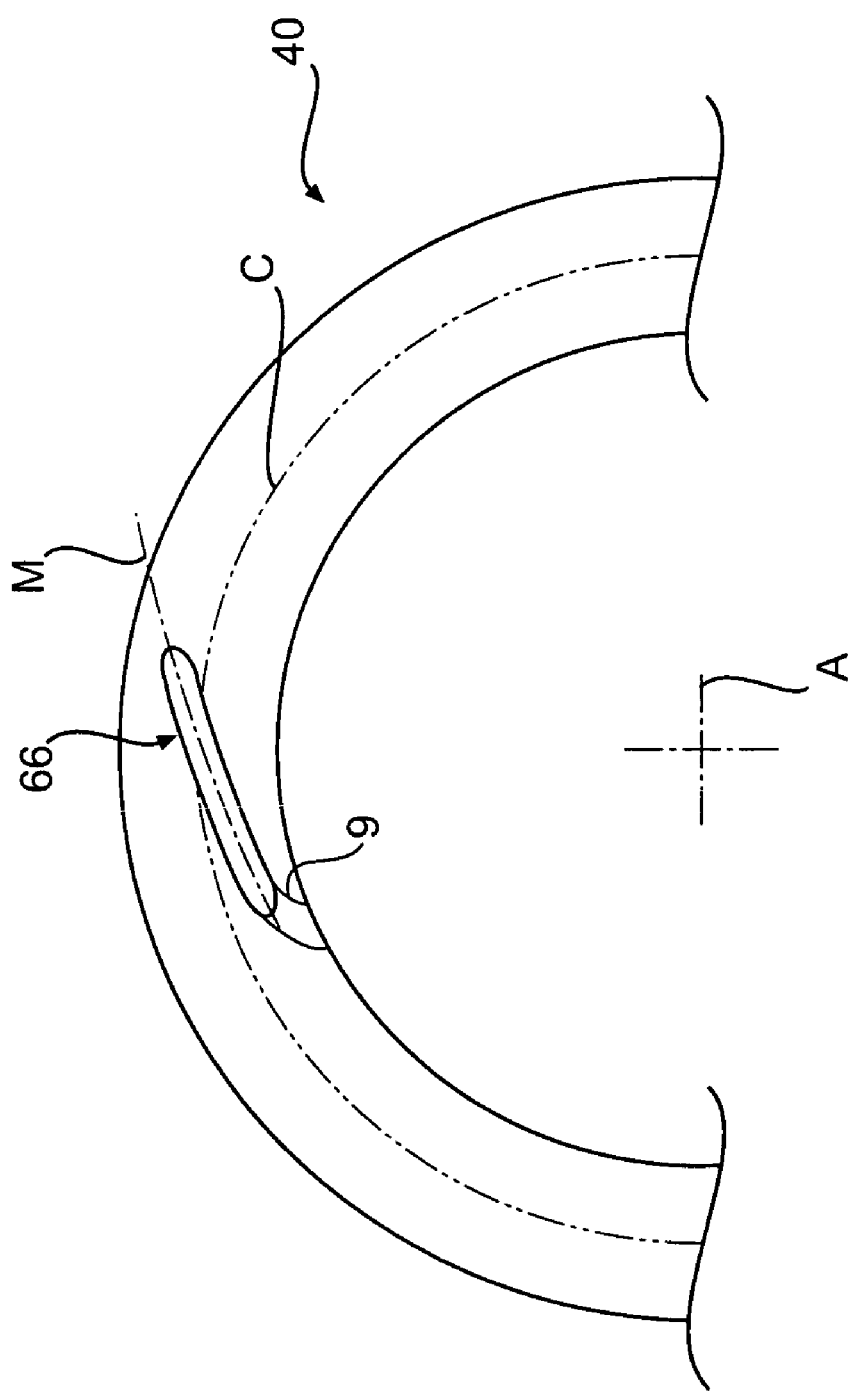
FIG. 2D is a schematic view of a slot within the synchronization ring of the thrust vectorable FVAN.

The slider blocks 52a, 52b are located within a slot 66 formed in the synchronizing ring assembly 40. The slots 66 formed within the synchronizing ring assembly 40 are non-circumferentially located about the engine longitudinal centerline axis A. That is, a mean line M defined by each slot 66 is transverse to a concentric circle S defined by the synchronizing ring assembly 40 about axis A (FIG. 2D). Preferably, the slots 66 include a radial assembly opening 69 to receive the slider blocks 52a, 52b in an extended length of the slot 66 to facilitate assembly. Alternatively, the slider blocks 52a, 52b may be formed of a multitude of pieces to facilitate assembly into the slot 66 which does not include a radial assembly opening 69.

Figure 4A:
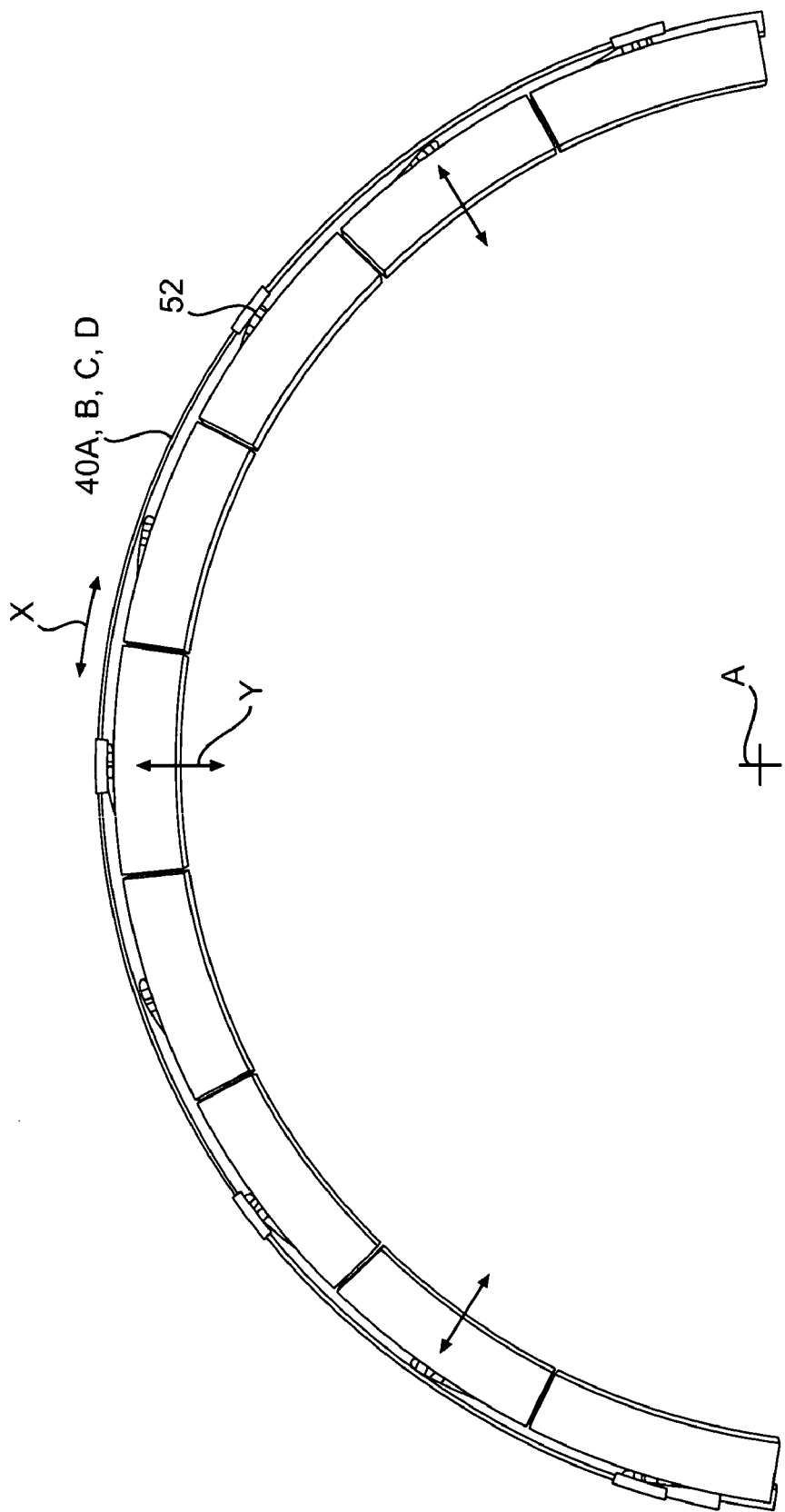
FIG. 4A is a rear view of a section of the thrust vectorable FVAN.
Figure 4B:
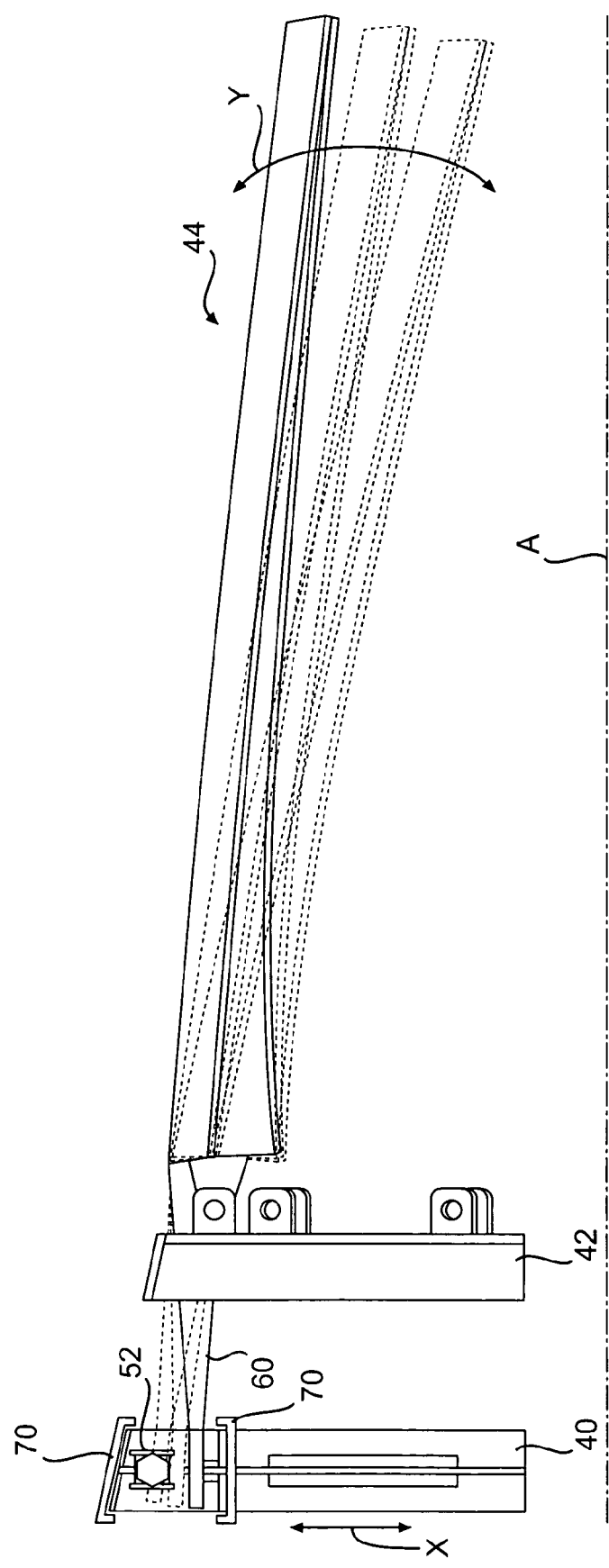
FIG. 4B is a side view of the flap assembly in a multiple of positions.
Figure 4C:
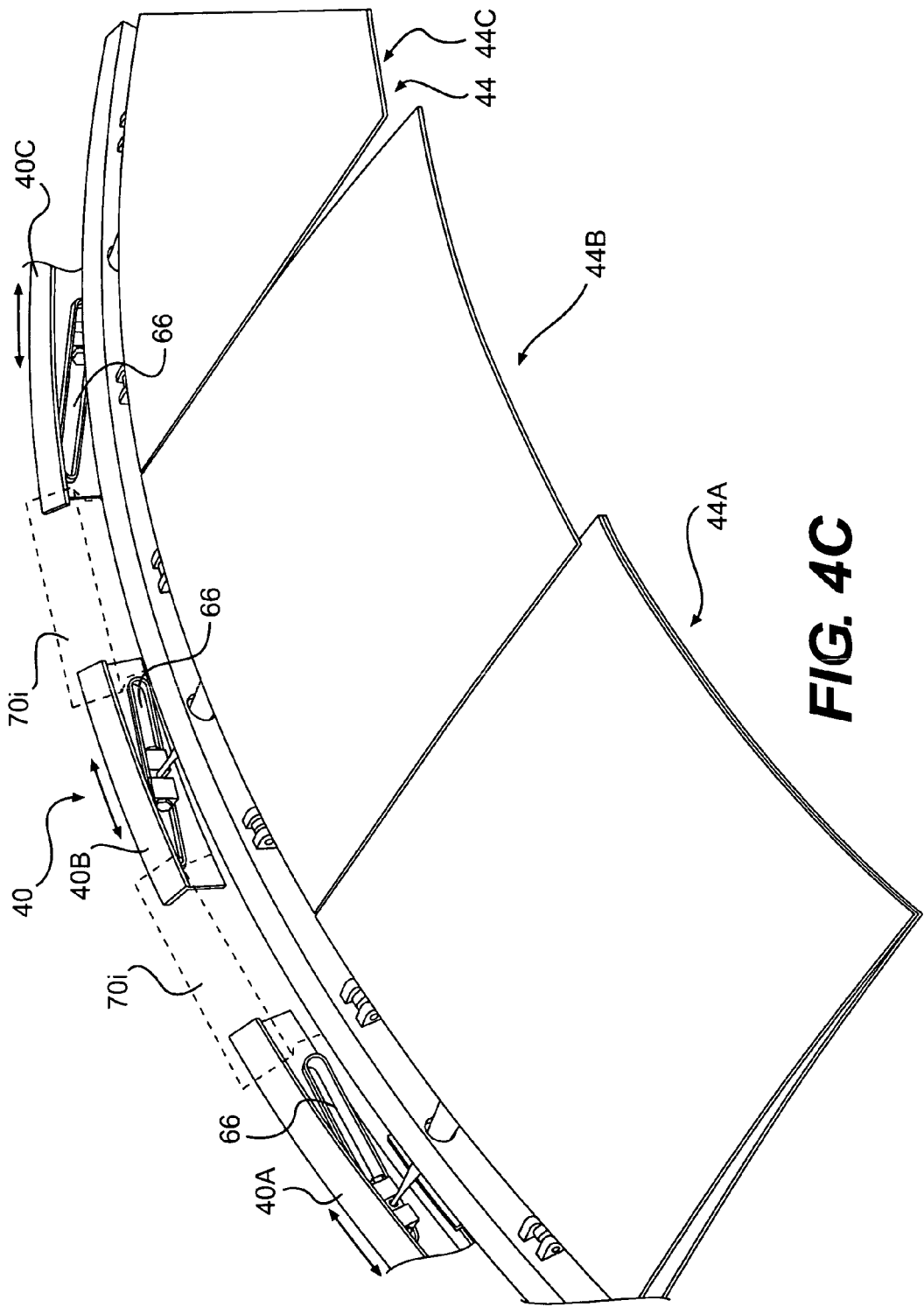
FIG. 4C is a perspective view of the flap assembly in a multiple of positions in which each flap is shown in a different position.

In operation, the actuator assembly 48 independently rotates the synchronizer ring segments 40A-40D of the synchronizing ring assembly 40 circumferentially about the engine longitudinal centerline axis A (double headed arrow X; FIG. 4A). Within each synchronizer ring segment 40A-40D, the slider block assembly 52 moves within the slot 66 such that the hinge beam rod 60 converts radial movement to tangential movement at each flap assembly 44A-44D to vary the diameter of the associated flap assembly 44A-44D (illustrated in a multiple of exemplary positions in FIGS. 4B and 4C). When all the synchronizer ring segments 40A-40D of the synchronizing ring assembly 40 move in unison, the periphery of the annular fan exit area between the fan nacelle and the core nacelle (FIG. 1C) is varied. When particular segments 40A-40D of the synchronizing ring assembly 40 are moved separately, the periphery of the annular fan exit area between the fan nacelle and the core nacelle (FIG. 1C) provides an asymmetric fan exit area.

Figure 5A:
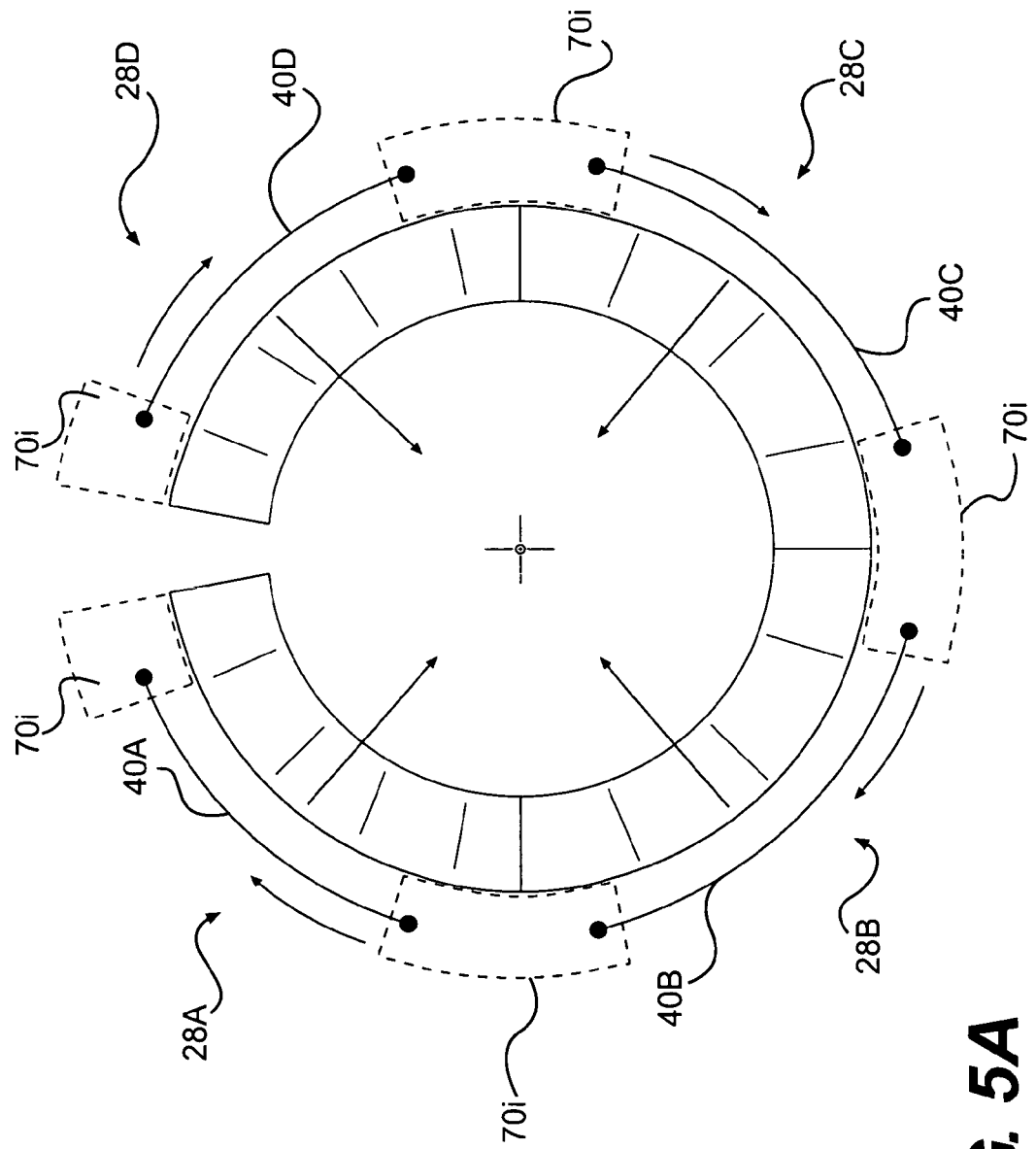
FIG. 5A is a schematic rear view of the thrust vectorable FVAN in an example constricted position wherein each segment has been positioned in a synchronized manner to reduce the fan exit throat area.
Figure 5B:
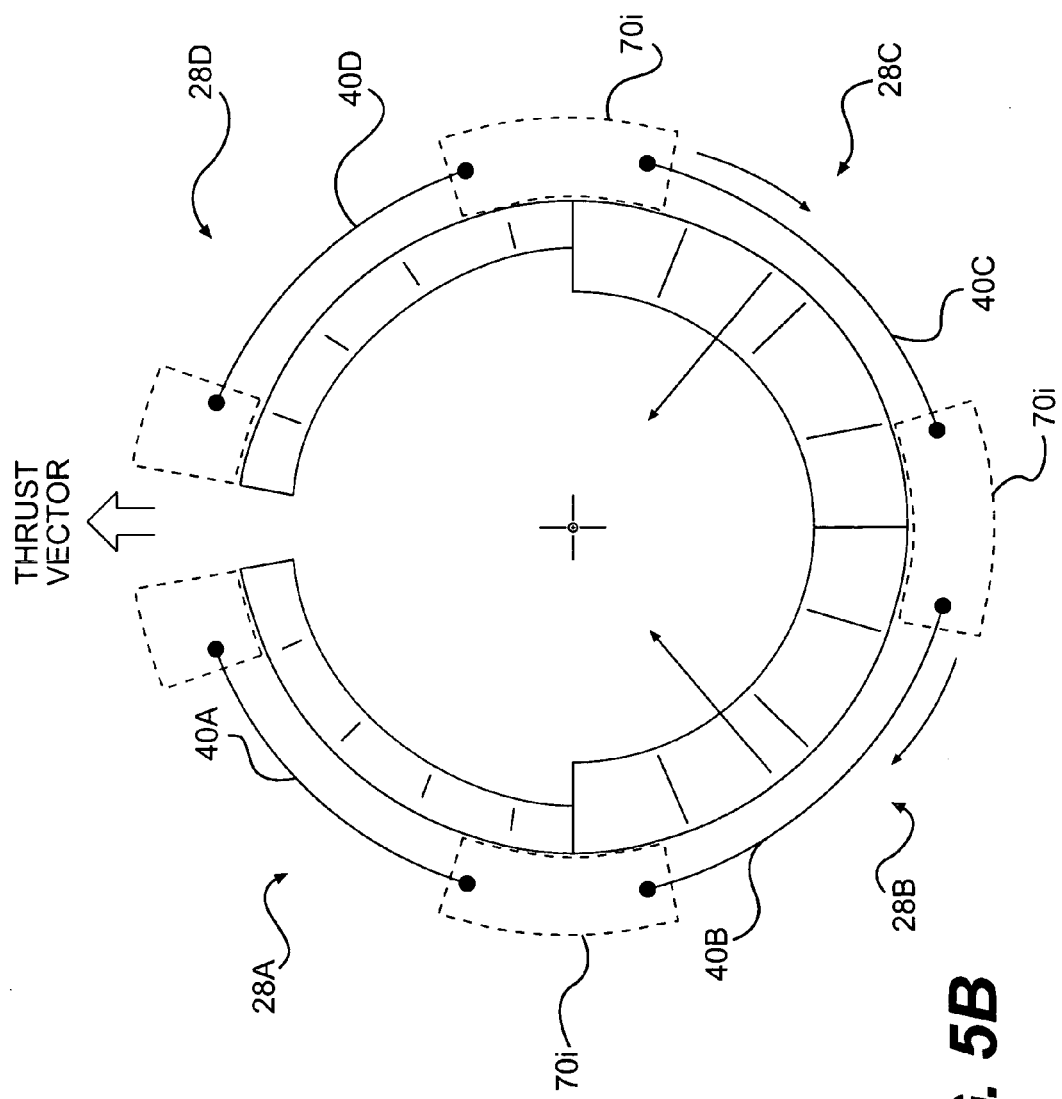
FIG. 5B is a schematic rear view of the thrust vectorable FVAN in an example thrust vectored position wherein the lower segments are asymmetrically positioned relative the upper segments to vector the thrust exiting the fan exit throat area in an "up" direction toward the engine flow.

By adjusting the entire periphery of the thrust vectorable FVAN 28 in which all segments 28A-28D are moved simultaneously (FIG. 5A; FVAN 28 constricted symmetrically), engine trust and fuel economy are maximized during each flight regime by varying the fan nozzle exit area. By separately adjusting the segments 28A-28D of the thrust vectorable FVAN 28 to provide an asymmetrical fan nozzle exit area (FIG. 5B; only FVAN segments 28B and 28C constricted such that thrust is directionally vectored), engine trust is selectively vectored to provide, for example only, trim balance or thrust controlled maneuvering.

Preferably, each actuator 48A-48D (FIG. 2) or set of actuators utilized in conjunction with each segment 28A-28D of the actuator assembly 48 communicates with an engine controller or the like to adjust the position of each segment 28A-28D of the thrust vectorable FVAN 28. However, other control systems including flight control systems may likewise be usable with the present invention to integrate the thrust vectorable FVAN 28 with an aircraft flight control system.

That is, the thrust vectorable FVAN 28 is utilized as another control system integrated with the aerodynamic control surfaces.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fan nacelle which defines a fan bypass flow for a gas turbine engine comprising: a static ring defined about an axis; a first flap assembly segment pivotally mounted to said static ring; a second flap assembly segment pivotally mounted to said static ring; a first synchronizing ring segment rotatable about said axis relative said static ring; a second synchronizing ring segment rotatable about said axis relative said static ring; a first linkage mounted to said first synchronizing ring and said first flap assembly segment such that a first semi-annular fan exit throat area segment defined by said first flap assembly segment is adjustable in response to rotation of said first synchronizing ring; a second linkage mounted to said second synchronizing ring and said second flap assembly segment such that a second semi-annular fan exit throat area segment defined by said second flap assembly segment is adjustable independently of said first semi-annular fan exit throat area segment in response to rotation of said second synchronizing ring to selectively generate a thrust vector off said axis.

2. The fan nacelle as recited in claim 1, wherein said first flap assembly segment and said second flap assembly segment each includes a multitude of flaps nested together in a tongue and groove arrangement.

3. The fan nacelle as recited in claim 1, wherein said first semi-annular fan exit area segment and said second first semi-annular fan exit area segment define upper an lower segments of an annular fan exit area.

4. The fan nacelle as recited in claim 1, wherein said flap assembly includes a hinge beam rod which extends through said static ring.

5. The fan nacelle as recited in claim 3, wherein said hinge beam rod engages a slider block movable within each of a multitude of slots defined within said first synchronizing ring segment and said second synchronizing ring segment.

6. The fan nacelle as recited in claim 4, wherein each of said slots defines a mean line transverse to a concentric circle defined by said first and second synchronizing ring segments about said axis.

7. The fan nacelle as recited in claim 1, wherein said first synchronizing ring segment and said second synchronizing ring segment are defined on said concentric circle.

8. The fan nacelle as recited in claim 6, wherein said first synchronizing ring segment and said second synchronizing ring segment are concentric.

9. The fan nacelle as recited in claim 1, further comprising a linear actuator which separately rotates each of said first synchronizing ring segment and said second synchronizing ring segment.

* * * * *

UNITED STATES PATENT AND TRADEMARK OFFICE
CERTIFICATE OF CORRECTION

PATENT NO. : 7,637,095 B2
APPLICATION NO. : 11/582219
DATED : December 29, 2009
INVENTOR(S) : Winter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,637,095 B2 | Page 1 of 1 |
| APPLICATION NO. | : 11/582219 | |
| DATED | : December 29, 2009 | |
| INVENTOR(S) | : Winter et al. | |

It is certified that error appears in the above-identified patent and that said Letters Patent is hereby corrected as shown below:

Claim 5, Column 6, line 15: "claim 3" should read as --claim 4--

Claim 6, Column 6, line 19: "claim 4" should read as --claim 5--

Claim 7, Column 6, line 23: "claim 1" should read as --claim 6--

Claim 8, Column 6, line 26: "claim 6" should read as --claim 1--

Signed and Sealed this
Fifteenth Day of May, 2012

David J. Kappos
*Director of the United States Patent and Trademark Office*